May 26, 1936.  C. H. WILD  2,042,164

LABELING MACHINE FOR CYLINDRICAL AND SIMILAR PACKAGES

Filed July 27, 1933     13 Sheets-Sheet 2

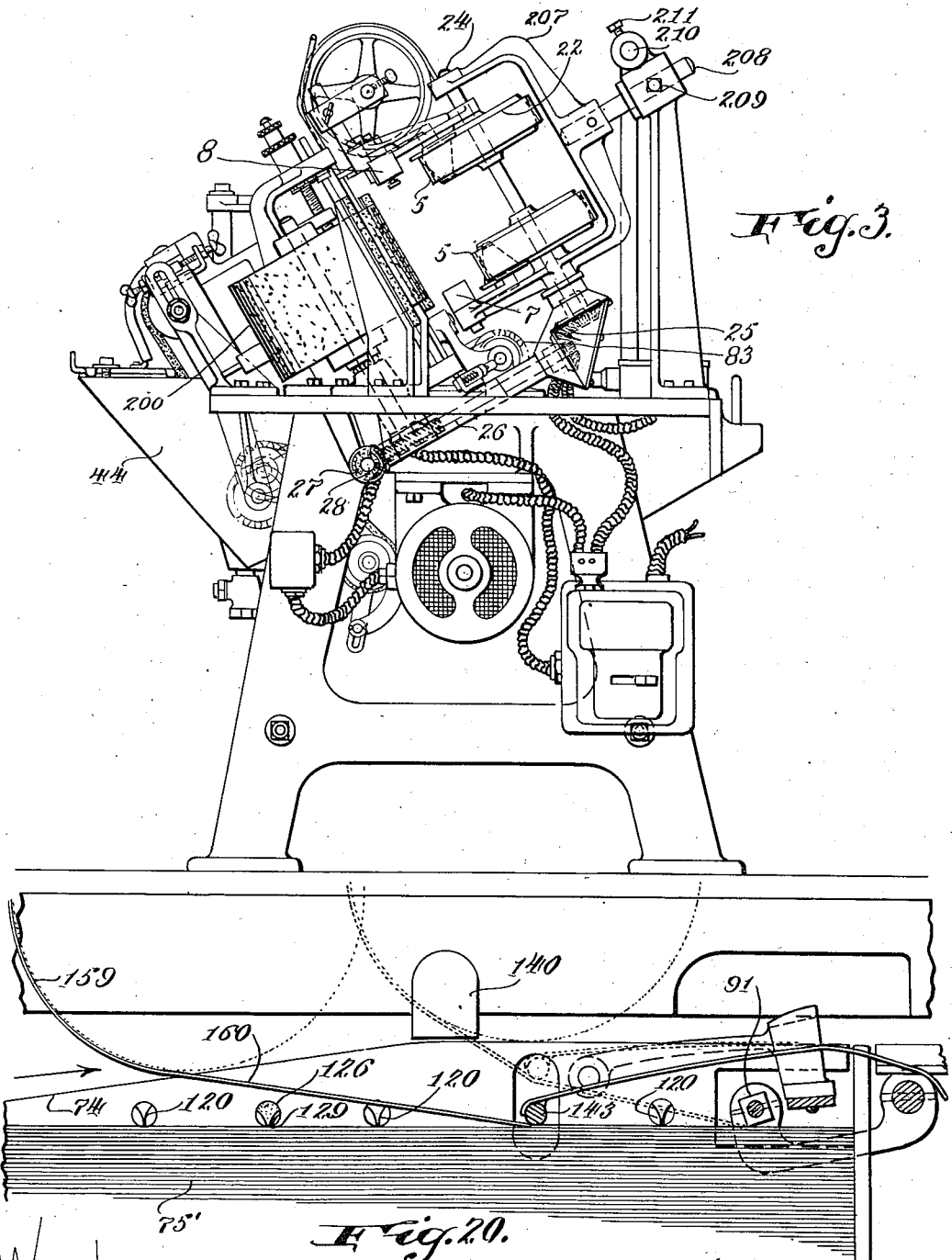

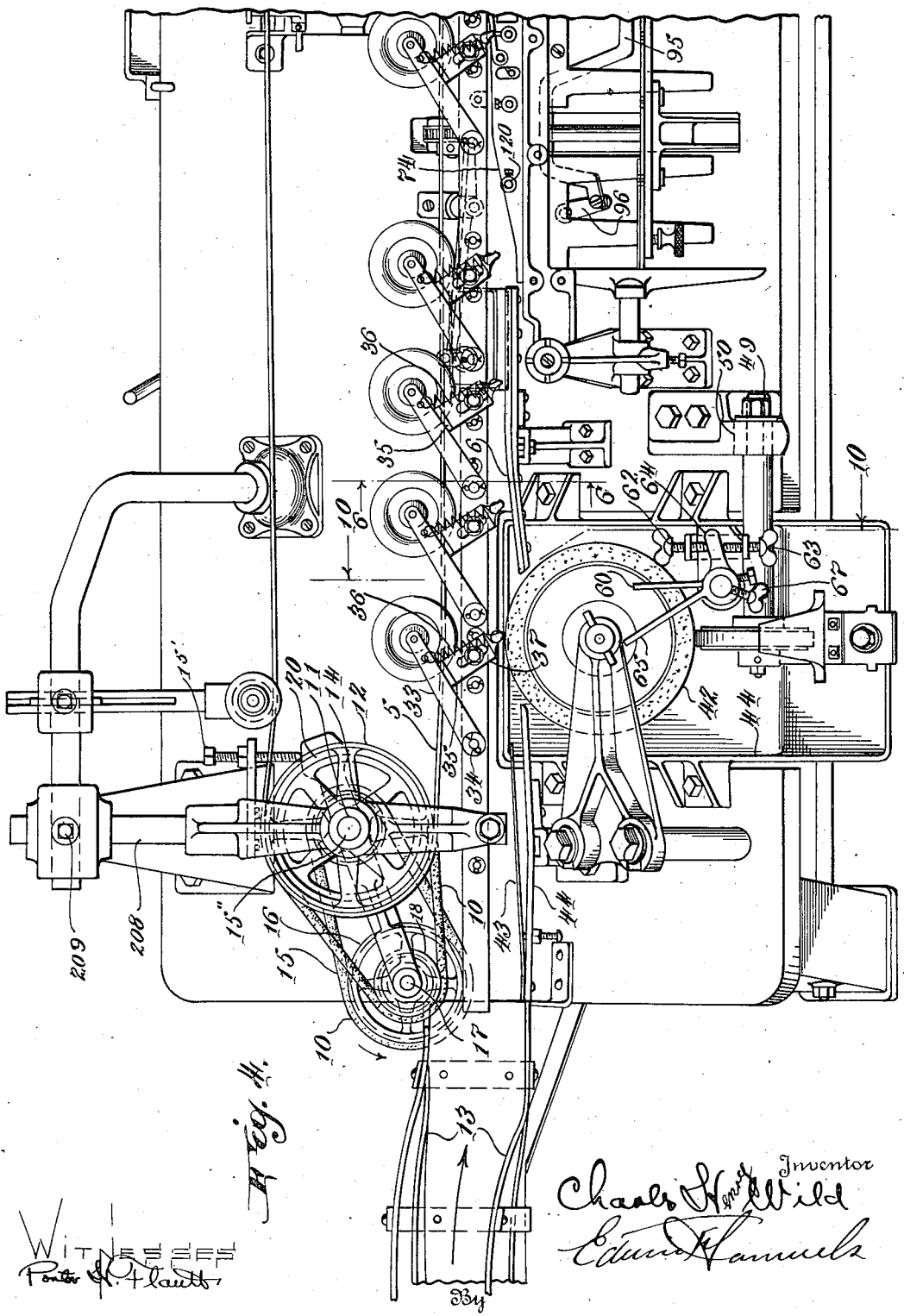

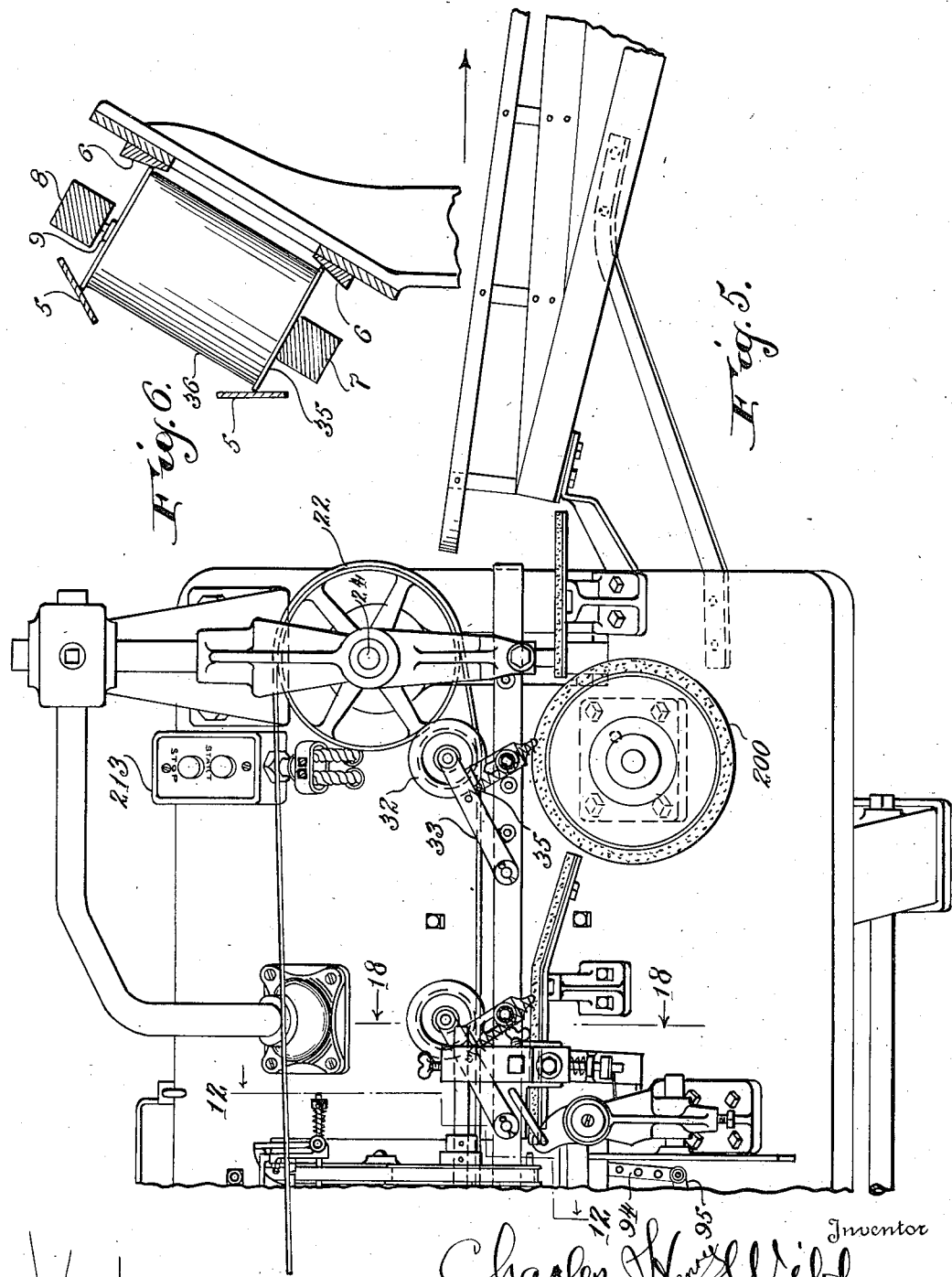

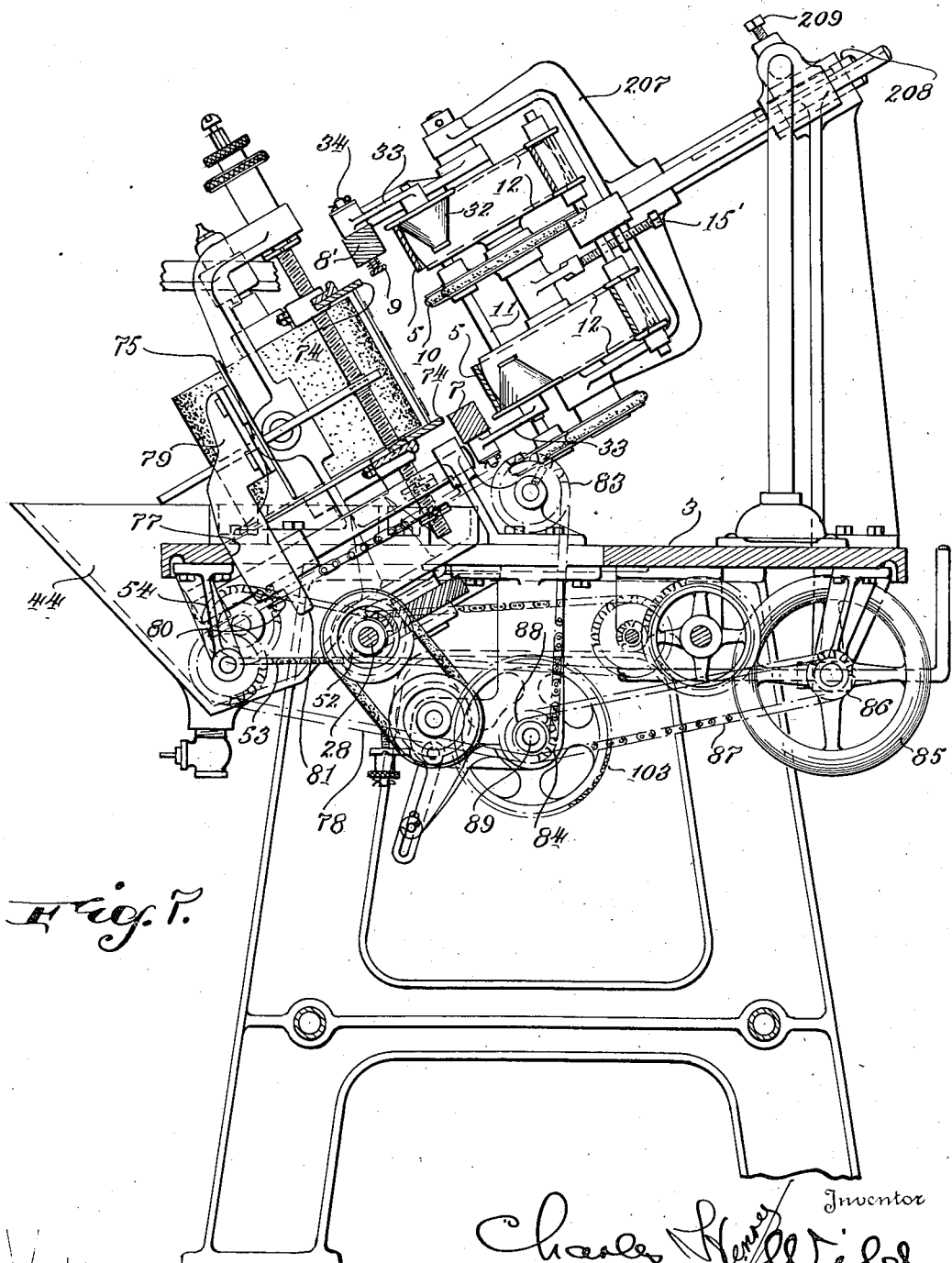

May 26, 1936. C. H. WILD 2,042,164
LABELING MACHINE FOR CYLINDRICAL AND SIMILAR PACKAGES
Filed July 27, 1933. 13 Sheets-Sheet 7
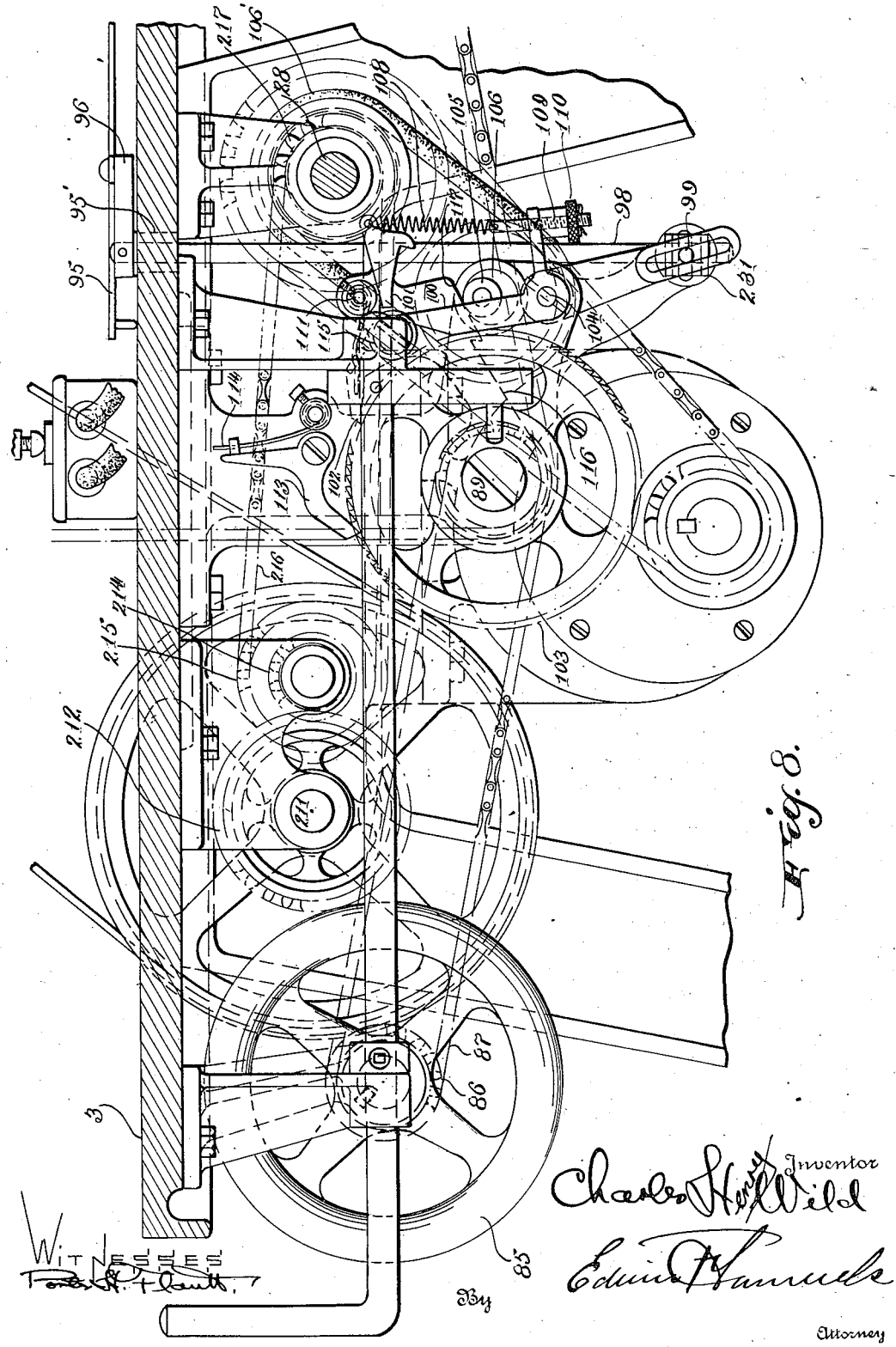

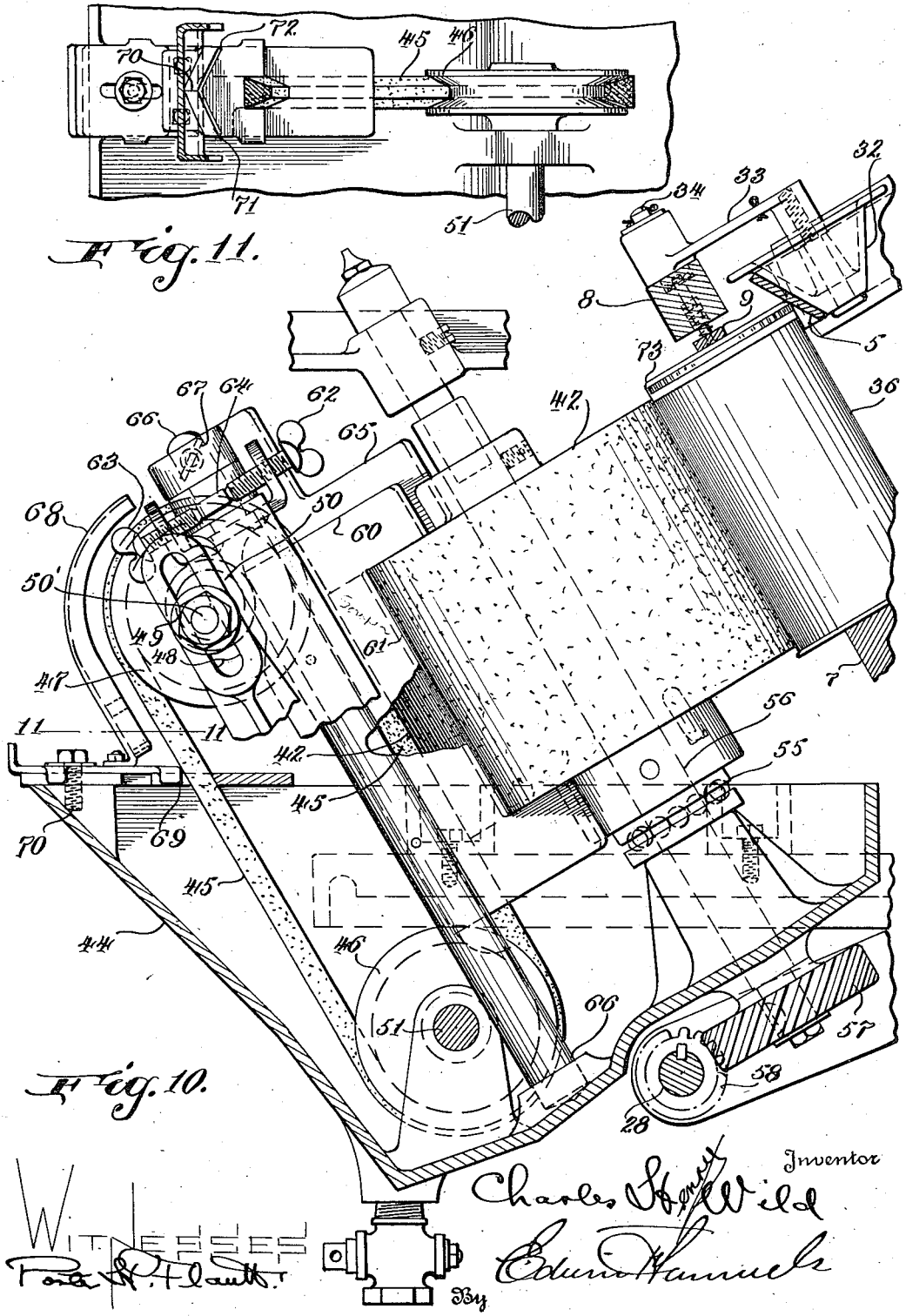

May 26, 1936.  C. H. WILD  2,042,164
LABELING MACHINE FOR CYLINDRICAL AND SIMILAR PACKAGES
Filed July 27, 1933   13 Sheets-Sheet 10
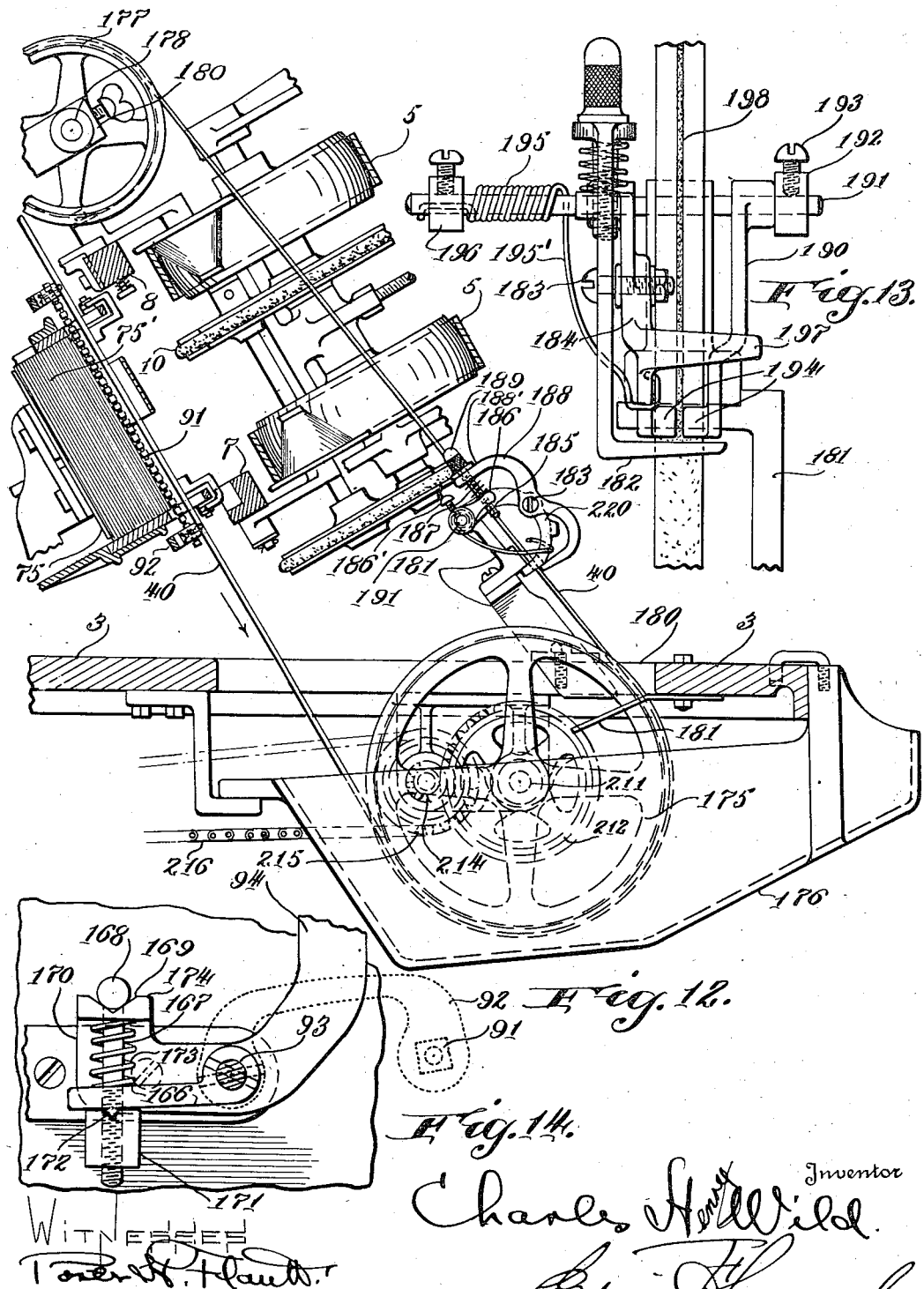

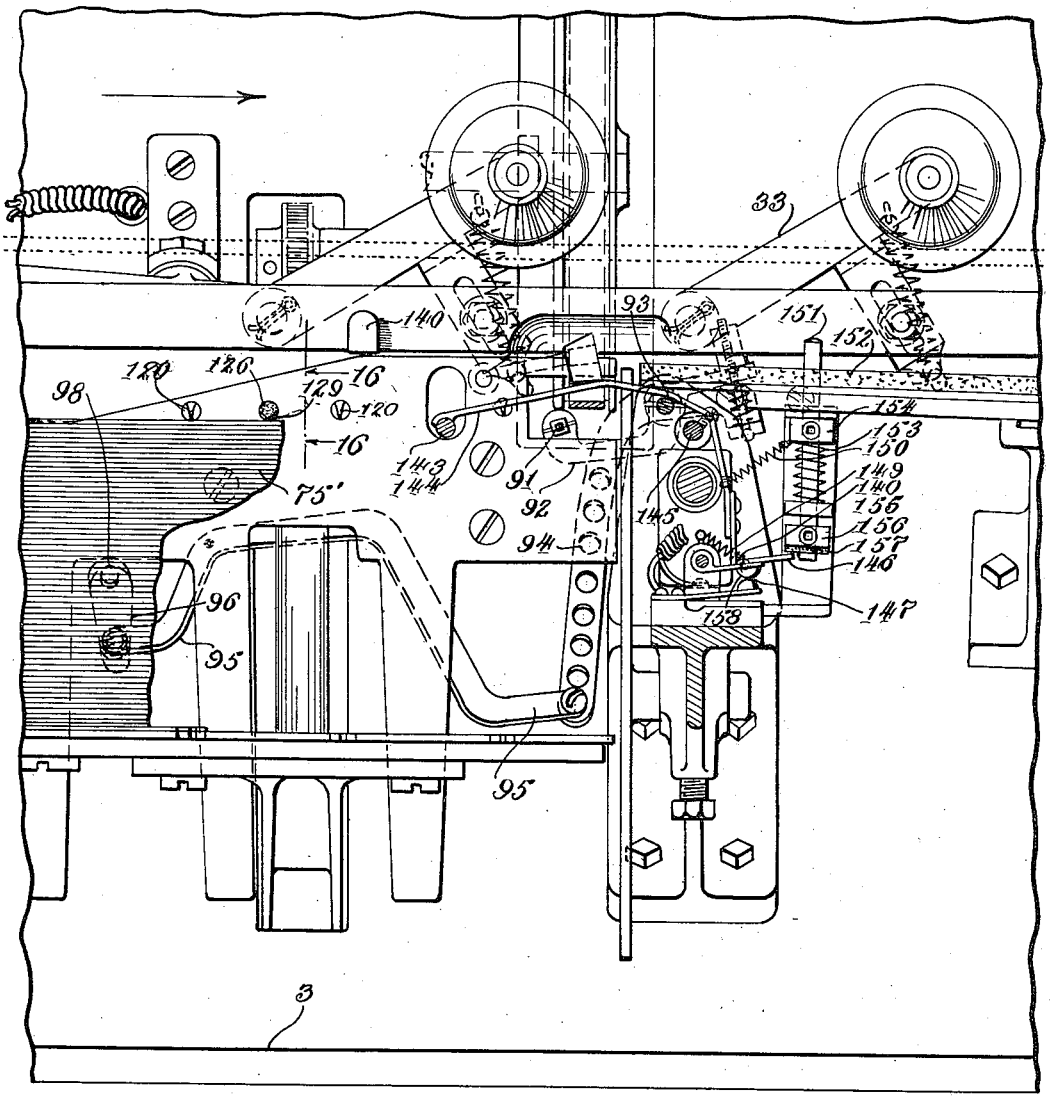

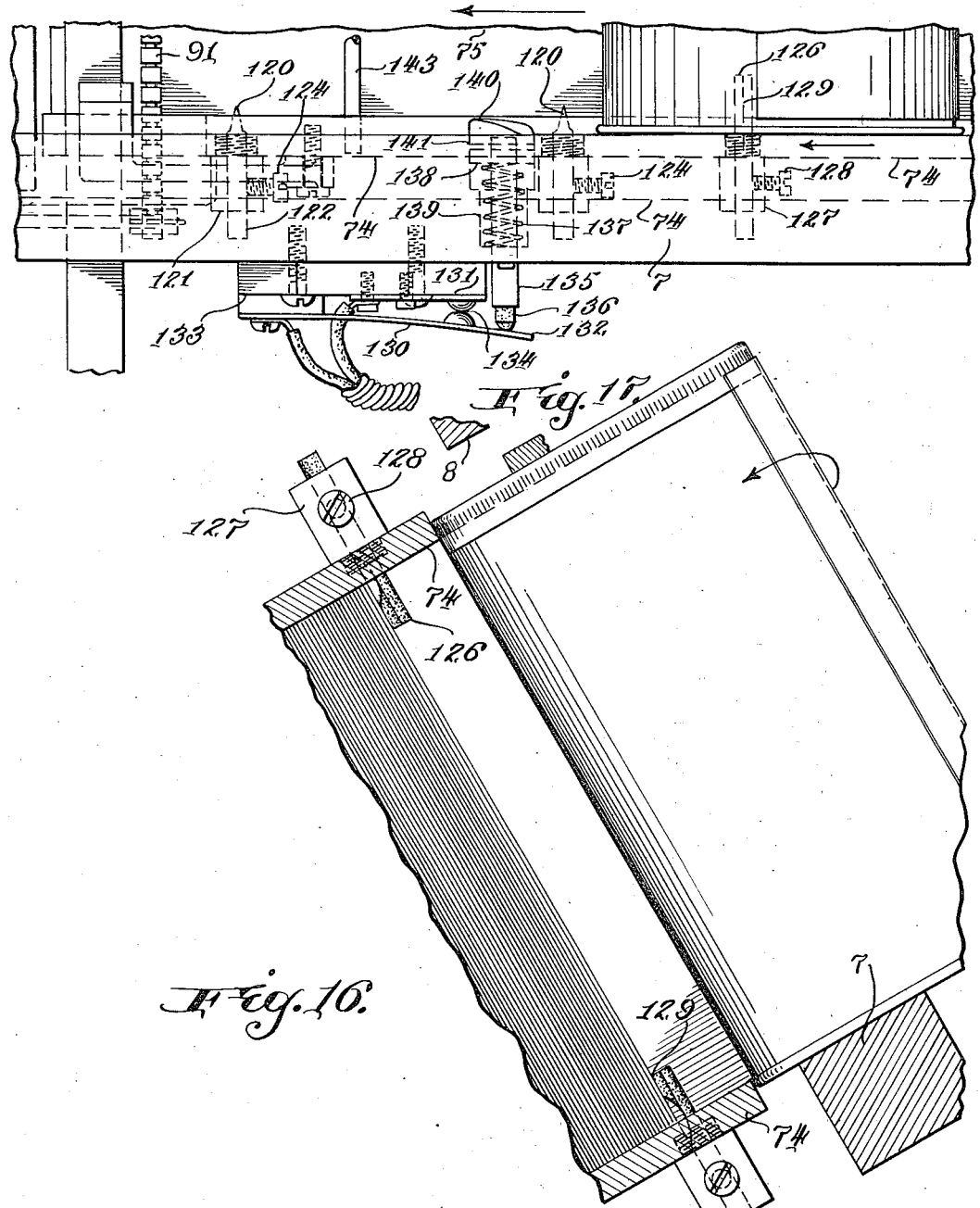

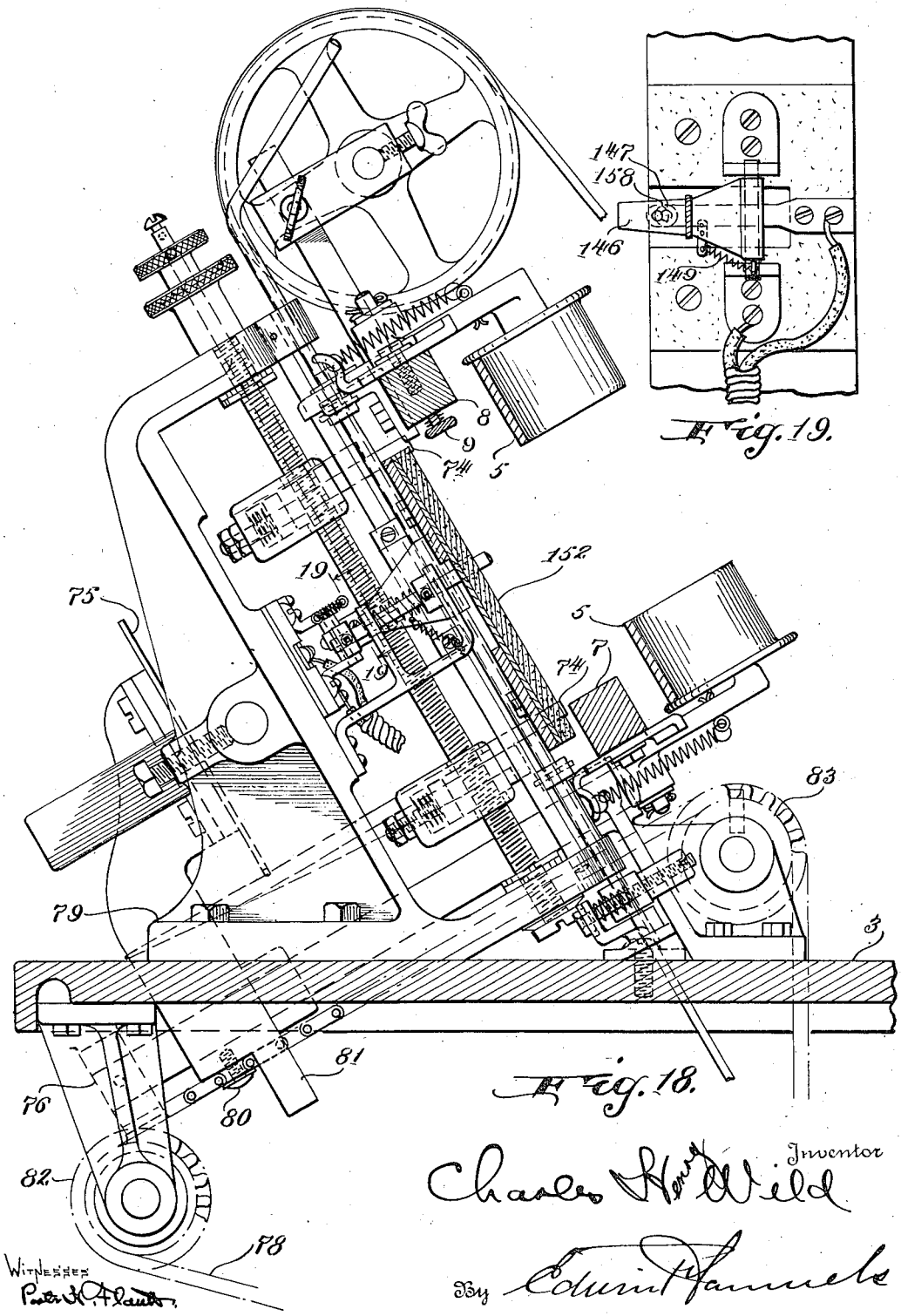

Patented May 26, 1936

2,042,164

UNITED STATES PATENT OFFICE 2,042,164

LABELING MACHINE FOR CYLINDRICAL AND SIMILAR PACKAGES

Charles Henry Wild, Baltimore, Md., assignor to Burt Machine Company, Incorporated, Baltimore, Md., a corporation of Maryland Application July 27, 1933, Serial No. 682,408

41 Claims. (Cl. 216—58)

The invention relates to a machine for labeling cylindrical packages the containers being of metal, paper or other suitable material.

An important feature of the invention resides in a method and means for labeling whereby substantially the entire cylindrical surface of each package which may include the overlapping edges of the cover, if an overlapping cover is used, is given a very thin coat of relatively dry, heavy, strong adhesive so that the labels are subject to the action of little if any moisture, the area coated being of a width slightly less than the width of the labels so as to permit the smearing of the adhesive.

The labels are then applied to the coated surfaces of the packages and rolled into close contact with the surfaces of the packages.

In accordance with the existing practice, it has been found necessary in picking up the labels on the packages to merely spot the package with the adhesive. This is to avoid wetting of the labels and consequent swelling and wrinkling of the labels which when they are rubbed into place, to cause them to lie flat, has resulted in the formation of bubbles, wrinkles and creases which so injure the appearance of the packages as to make them unacceptable to the trade. On this account the automatic labeling practice has been mainly confined to the mere spotting of the packages in picking up the labels as aforesaid with the result that the label is not firmly or uniformly secured. Labels thus applied often come loose, do not look well and are of little, if any, assistance in holding the cover in position. Also, the improved method of labeling is of great advantage in connection with paper packages in general and particularly with those in which the paper forming the cylindrical side of the packages is wound in the form of a helix, in that the label being secured to the entire surface constitutes a substantial reinforcement of the package, greatly increasing the rigidity and durability of the finished package.

The preferred form of the machine also includes an improved arrangement of the feed belts and can tracks whereby they are caused to contact the corners only of the cans, the belts in the engaging position being guided by inclined or tapered pulleys whereby they are supported in contact with the corner edges of the packages. In this way smearing of the adhesive applied to the cylindrical surfaces of the packages is prevented. This feed may, however, be otherwise utilized.

The invention also includes various improved features and details applicable to this and other types of labeling machines, particularly for cylindrical packages, which can be fed by rolling.

The drawings show a machine for labeling cylindrical packages comprising paper, metal and other containers which in the preferred form of the machine shown are fed through the machine in a position in which the axes of the cylindrical packages are inclined upwardly from the horizontal and at an angle to the vertical, thus preventing spilling of the contents in case the packages are not completely closed at the top. At the same time the advantages of the machines in which the packages are fed with the axes horizontal are retained. While this form of feed is capable of general application, it is of particular interest and importance in connection with packages of salt, baking powder and other materials in which the cover is held in position in part by friction and in part by the adhesion to the cover of the edge of the label, and in packages where there is an easily openable pouring spout or similar device or in which the covers are more or less easily removed.

In the form of the machine illustrated, the package as fed is tipped up till its axis is at an angle of thirty degrees with the vertical though this angle may be varied by the designer in accordance with the conditions encountered.

While the machine in the preferred form illustrated provides for the feeding of the packages in the inclined position shown, various features of the invention are capable of application to a machine in which the packages are fed with the axes horizontal and in some instances to machines in which the packages are fed in upright position.

In the accompanying drawings I have illustrated a machine embodying the features of the invention in the preferred form.

In the drawings:

Figure 3 is an elevation of the machine as seen from the delivery end, i. e., from the left in Figure 1.

Figure 4 is a fragmentary view looking down on the machine in the direction of the axis of the cans, i. e., in the direction of the arrows 4, 4 in Figure 2 and showing the intake and feed end of the machine.

Figure 5 is a similar view taken at the same angle showing the delivery end of the machine.

Figure 6 is a section on the line 6, 6 in Figure 4 showing the feed belts and the can tracks or guides.

Figure 7 is a section on the line 7, 7 in Figure 1, looking in the direction of the arrows, i. e., in the direction opposite to the feed.

Figure 8 is a section on the line 8, 8 in Figure 1, looking in the direction of the arrows, i. e., in the direction of the feed and showing the intermittent drive for the label feed mechanism.

Figure 10 is a section on the line 10, 10 in Figure 4, looking in the direction of the arrows showing the paste roller and belt whereby the adhesive is applied to the packages.

Figure 11 is a section on the line 11, 11 in Figure 10 showing the paste belt guard.

Figure 12 is a section on the line 12, 12 in Figure 5 showing the lap end label pasting belt, the belt scraper and the label curler.

Figure 13 is a detail of the lap end label pasting belt scraper.

Figure 14 is a detail view of the adjustment for the curler bar to determine the thickness of the label package, i. e., the position of the top label which is about to be taken up by the next package fed through the machine.

Figure 15 is a section at right angles to the axes of the packages being fed looking at the top label of the label pack and showing the automatic switches and detectors by which the operation of the machine is controlled in connection with the picking up of the labels, also showing part of the label pack, the angle of this view being the same as that of Figures 4 and 5.

Figure 16 is a section on the line 16, 16 in Figure 15, showing the improved rubber label holder in operation.

Figure 17 is a fragmentary view at right angles to Figure 5 showing the label holding knives and the rubber label holder, the detectors and the package switch.

Figure 18 is a section on line 18, 18 in Figure 5 showing the label feed in elevation.

Figure 19 is a section on line 19, 19 in Figure 18, showing the package switch looking at the same at right angles to the axes of the cans or packages.

Figure 20 is a view illustrating the operation of the label switch shown in detail and in Figure 15. It also shows the label knives, rubber label holder and the curler bar in their relation to said switch.

Figure 2:
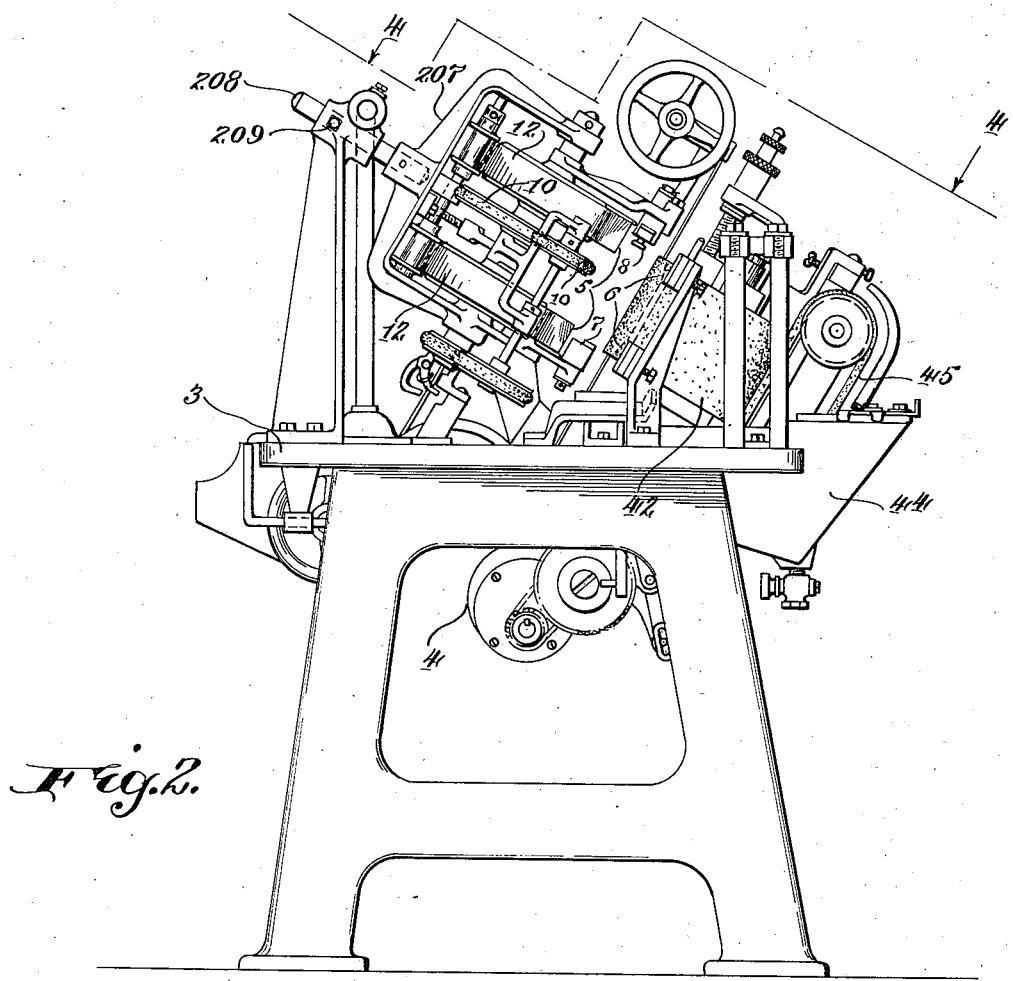
Figure 2 is an elevation of the machine as seen from the feed end, i. e., from the right in Figure 1.
Figure 9:
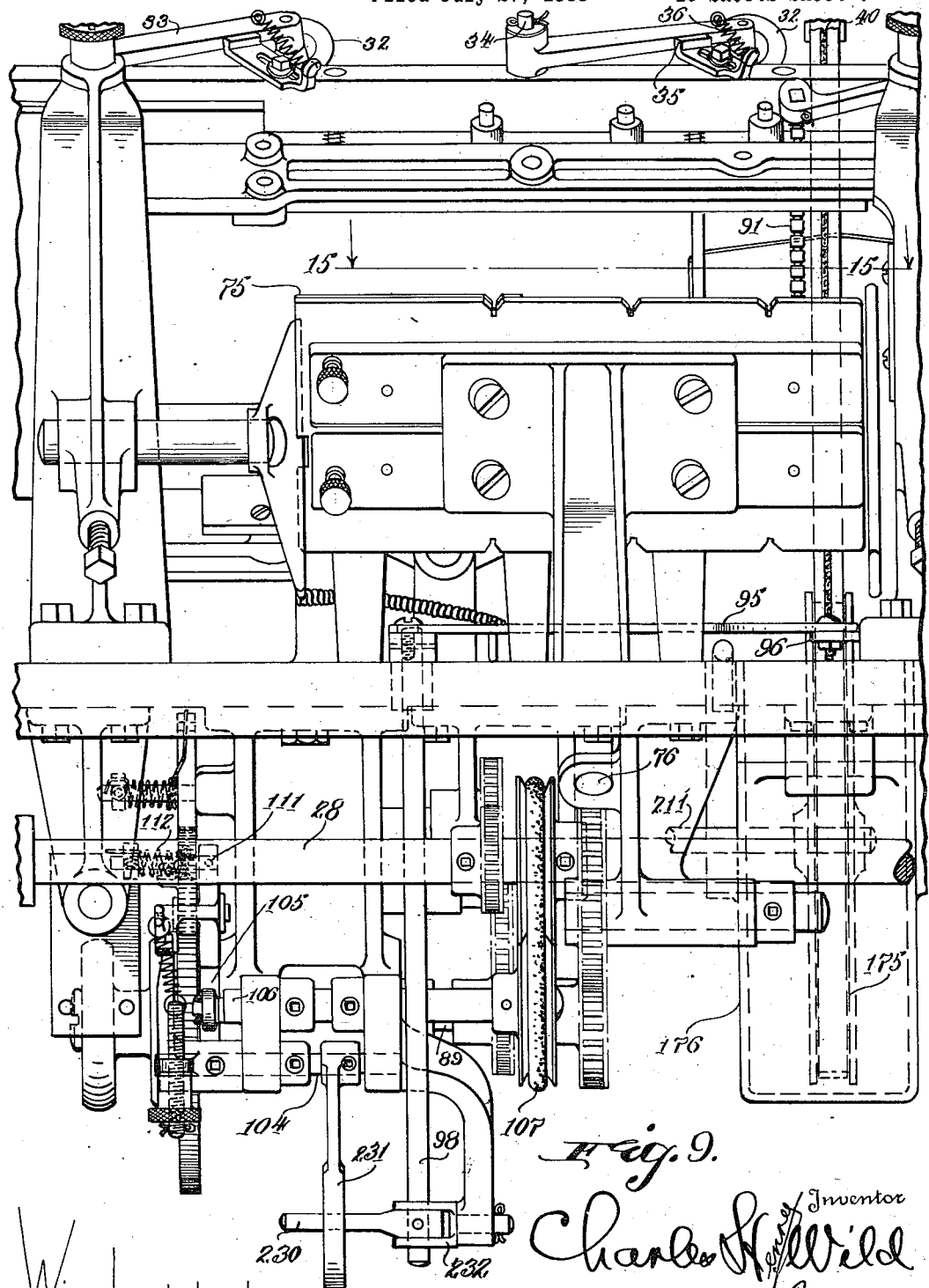
Figure 9 is an elevation looking from the right, i. e., the opposite side from Figure 1, showing the label feed.

Referring to the drawings by numerals, each of which is used to indicate the same or similar parts in the different figures, the machine comprises a frame 1, having upright legs 2, and a base 3 on which the labeling elements are mounted, the machine being driven in any suitable manner as by means of an electric motor 4, which may be controlled automatically or otherwise, as more fully hereinafter described. The machine as illustrated, having particular reference to Figures 2, 3, 4 and 7, includes can feed belts 5 by which the cans or other packages are propelled through the machine by rolling, the belts preferably engaging the corner or circular peripheral edges of the packages as hereinafter more fully described. The tracks 6 which are preferably inclined to the axes of the cans oppositely to the belts 5 are so arranged that they also engage the edges only of the packages, and the structures shown having particular reference to Figure 2, also includes guide rails 7 and 8, which engage the circular ends of the cylindrical cans or packages. While I have shown two separate belts 5, engaging the opposite end edge of the cans, it will be understood that this is the preferred form only the fact that there are two separate belts instead of a single belt so deflected as to serve the same purpose, not being essential. This is also true of the tracks 6, the inclined arrangement to engage the end edges of the cylindrical cans or packages is the important feature of these elements.

The guide rails in the preferred form of the invention, i. e., where the cans are fed in an inclined position, are above and below the cans or packages and the upper rail 8 has a spring guide member 9, consisting of yielding sections, mounted on spring pins, see also Figure 10, a detailed description of such a spring guide rail being regarded as unnecessary in the present state of the labeling art.

Having particular reference to Figure 4, it will be noted that the cans or packages are fed by way of a chute 13 at the end of which they come in contact with the spacing belt 10 which is operated from the shaft 11 driven by the feed belt pulley 12 which is an idler, the feed belt being driven from the opposite end. The spacer belt 10 is driven at a relatively low speed by means of a small pulley 14 on shaft 11 which pulley 14 drives a belt 15 which passes around a relatively large pulley 16 on the shaft 17 supported in suitable brackets. This shaft at 17 in turn carries small pulley 18 upon which the spacer belt 10 runs and by which it is driven. Spacer belt 10 is passed from 18 around pulley 20 which rotates freely on the shaft 11, which is convenient for this purpose. The belt is pivotally supported at 15" and is adjusted downwardly by means of a set screw 15' and yields upwardly about said pivot.

The relatively slow speed of the spacer belt 10 provides for the relatively slow presentation of the cylindrical packages to the feed belts 5 which moving at a relatively increased speed, serve to separate the cans by a suitable interval as they are taken from the spacer belts 10. The spacing results from the difference in surface speeds of the belts.

Figure 1:
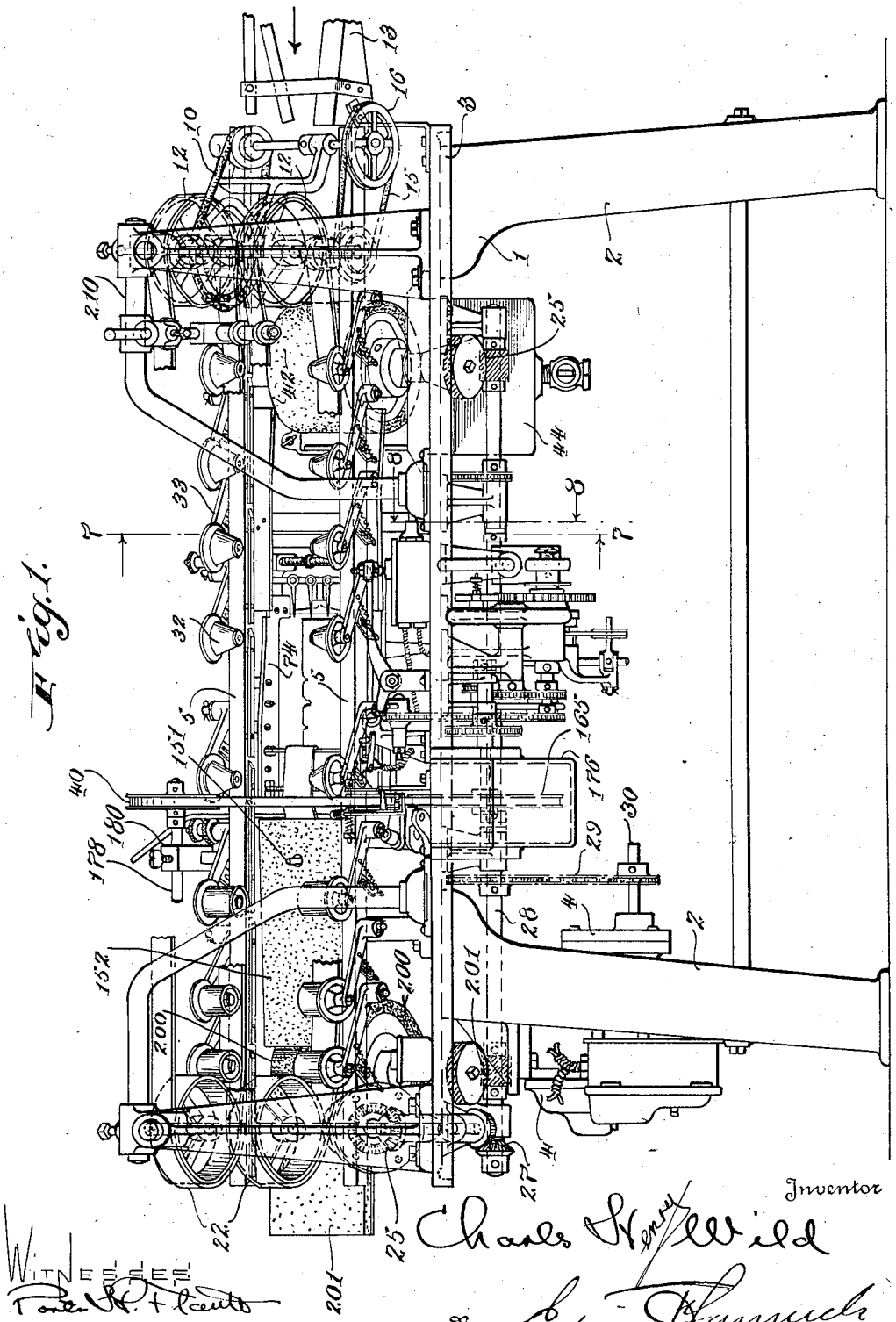
Figure 1 is an elevation of the machine as seen from the position in which the operator stands, i. e., looking at it from the left side as considered from the direction of feed which is from the right in said figure.

The can feed belts 5 are driven from the delivery end of the machine, being operated by drive pulleys 22 mounted on feed belt pulley drive shaft 24, see Figure 3. This shaft has a driving connection by bevel gearing 25 to a bevel gear shaft 26 which is operatively connected by bevel gears 27 to the drive shaft 28, Figure 1, which is driven by chain and sprocket connection 29 from the motor shaft 30.

The manner of guiding the can feed belts 5 is of considerable interest. They are guided to and over the label pack by inclined guide pulley members 32 spaced along the machine from the feed end up to the point named in such a way as to support these belts in the position shown more or less diagrammatically in cross section in Figure 6 so that they engage the corners only of the cans or packages preventing smearing of the adhesive, when the package is coated with adhesive, also preventing disfigurement and displacement of the labels when they are attached. These guide pulleys or, as they may be more properly described, rollers, are shown, see particularly in Figures 1 and 7, in the form of conical rollers. These are preferably mounted on adjustable brackets. The adjustable feature may be treated as providing for the adjustment of the feed belts into contact with the edges of the packages and if desired for adjustment of the machine to the treatment of packages or cans of different sizes.

Having particular reference to Figures 1, 4, 7 and 10, the inclined can feed belt guide rollers 32, which are shown as conical, serving as an inclined belt guide, it being understood that a suitable inclined guide for the feed belts may be provided in some other way, are suitably spaced from the inclined tracks 6 to accommodate the particular diameter of package being treated. In the form shown they are pivotally mounted on arms 33 pivoted on the can guide rails 7 and 8 to swing toward and from the tracks 6. The pivot pins are indicated by reference character 34. By reference to Figures 1 and 4, it will be noted that the arms 33 are inclined in the direction of feed and that each is provided with an adjustable stop 35 and a tension spring 36 connected to the arm near the roller at one end and to the stop bracket or base 37 at the other end so that the rollers are normally positioned by the stops and may yield outwardly, and, in the form of machine shown, upwardly, to the pressure of the packages or cans to prevent cramping or crushing in case one is displaced.

In operation the belts are normally straight and parrallel to the surfaces of the belt pulleys 12 except when they are contacted by the edges of the cans or packages as shown in Figure 6 when they are pressed into contact with the inclined surfaces of the guide rollers 32 and thereby deflected and turned at an angle, Figure 6, so that they bear on the peripheral edges 35 of the cans or packages without contacting the paste coated cylindrical surfaces indicated at 36 in Figure 6.

The elements or groups of mechanism for applying adhesive, feeding the label, coating the lap end and rolling and pressing the label to final position on the package will be discussed in the order in which they occur beginning at the feed end of the machine.

The first of these elements not already described in the preferred form of machine shown is a roller for coating the cylindrical surfaces of the cans or packages with adhesive, though other coating means and other methods of applying adhesive may be used. As a feature of the invention I have devised a method of applying labels to packages which includes applying a thin coating of relatively nonaqueous adhesive to substantially the entire cylindrical surface of the packages in order that the label may be secured to the entire surface including in certain types of packages the edges of the cover, this being accomplished without wetting the label so as to disfigure it by swelling or warping or wrinkling due to expansion when wet. See Figures 1, 3, 4 and 10. To prevent smearing, the area coated is of a width slightly less than the width of the labels.

A coating roller, indicated by reference character 42, is mounted at the feed or intake end of the machine just beyond the feed belt pulleys 12 in the direction of the feed and immediately beneath and projecting slightly into the path of the packages. The drive hereinafter described rotates the roller on its contacting surface which engages the packages and moves oppositely to the feed of the packages at a speed preferably slightly less than that of the feed.

As the cans or packages enter the machine at the left in Figure 4, they are supported against the spacing belt 10 and in contact therewith and oppositely to the feed belt pulleys in contact with the can feed belts 5 by spring plates 43 from which the cans or packages pass almost immediately into contact with the coating roller 42 being supported for a slight intervening period on the plates 44 at their ends which are forward in the direction of feed. The coating material or adhesive for the coating roller 42 is retained in a receptacle 44 best shown in its relation to the roller in Figure 10. This receptacle or pot 44 is provided with a pickup belt 45 which dips into the adhesive and applies it to the roller. The belt 45 is carried by a drive pulley 46 and idler belt pulley 47, the latter being adjustable up and down to tighten the belt. For this purpose the pulley shaft 50 is mounted eccentrically on threaded stud 50' which is clamped in the slot 48 in a suitable bracket by means of a nut 49, the belt being adjustable toward and from the roller 42 to regulate the contact therewith by rotating shaft 50 about stud 50'. In the form shown the axis of coating roller 42 is at thirty degrees with the vertical and the belt is parallel to and on one side of it in contact with its surface. The belt drive pulley 46 carried on the belt drive shaft 51 may be driven in any suitable manner. Figure 7 shows, for this purpose a sprocket 52 mounted on the main shaft 28 and driving a chain 53 which engages and drives a sprocket 54 on the shaft 51.

The coating roller 42, as shown in Figure 10, is mounted on ball thrust bearings 55 and also in suitable journal bearings and the roller shaft 56 carries secured thereto a worm wheel 57 which is engaged by a worm 58 on the main shaft 28, whereby the roller is so driven that the upper or package contacting surface moves oppositely to the feed belts. The operation of the roller in this way and the method of coating is an important novel feature of the invention whereby the adhesive is applied to the packages by rolling rather than by rubbing, the roller surface moving with the can surfaces giving a uniform thin coating of relatively dry or nonaqueous adhesive which avoids wetting of the labels. Preferably the surface speed of the roller is slightly different from that of the package. The resulting action has been described as in the nature of a tread mill action with some lost motion or rubbing which is helpful, probably causing a slightly increased speed of rotation of the package with a slight retardation of its forward motion or at least with no increase of its forward motion.

The drawings, Figures 4 and 10, show scraping devices for determining the thickness of the adhesive on the roller 42. One of these, indicated by reference character 60, is cut out in U-shaped form, as best shown in Figure 10, to admit the coating roller and is provided with a scraping surface 61 extending the entire length of the cylindrical surface of the roller. This is adjusted toward and from the cylindrical surface of the roller, see Figure 4, by means of the opposed screws 62, 63, bearing on opposite sides of the arm 64 on the scraper shaft 66, which is substantially normal to the plane of the scraper so that with the scraper it forms a member in the nature of a bell crank lever. There is also a top or end scraper 65 on the roller 42 which is adjustable along the scraper shaft 66 and clamped in any desired position and adjustable by means of a screw bolt or thumb screw 67.

A further novel detail of the coating apparatus resides in the belt shield 68, see Figures 10 and 11. This shield is curved about the upper end of the belt above the receptacle and opposite the roller 42. It operates in conjunction with a scraper 69 at the top of the receptacle which is arranged to remove the surplus material from the belt as it comes out of the pot or receptacle. This scraper is adjustable toward and from the belt and clamped in adjusted position by bolt 70, engaging a slot in the scraper member. This shield or guard 68 is concave on the side disposed toward the belt and is preferably as shown in the form of a channel parallel to the belt and spaced away from it by a slight distance as indicated. The material caught in the channel tends to flow down the channel and back into the receptacle. The material thus flowing downwardly toward the paste pot is deflected from the scraper by an inclined deflector plate 71 shown in the form of a wedge which has its point 72 disposed upwardly in a direction opposite to the flow, the two ends or wings of the deflector blade at 72 being at the sides of the scraper so that the adhesive caught in the guard or shield is deflected by the deflector blade from the scraper and redeposited in the pot at the sides of the scraper. This prevents accumulation of adhesive on the scraper and consequent smearing of the roller 42 and the work.

The illustration, Figure 10, shows a can or other package in contact with the coating roll 42 and in operative position in relation thereto, the same being held in contact with the roller by the feed belts 5 which are guided and supported in inclined position, Figure 6, by the rollers 32. The can or package is also guided by the bottom and top can rails 7 and 8 and the spring rail 9. The can or package itself is indicated by reference character 36, Figure 10, the knurled portion at the top being the upper peripheral edge of the can above the label indicated by reference character 73. Both the can and coating roller axis in the form of machine shown are inclined at an angle to the vertical.

As already pointed out, an important feature of the invention resides in the method of labeling packages and cans by coating substantially the entire cylindrical surface, meaning an area slightly narrower than the label, with a very slightly aqueous or nonaqueous adhesive which secures the labels without wetting them thus avoiding soaking, softening, swelling, bubbling and the consequent wrinkling and disfiguring of the labels when the labeling operation is finished by rolling the labels into final position. The present inventor is believed to be the first to coat the cylindrical surface of the cans or packages in the automatic labeling operation, in this way thus securing the entire area of the label firmly to the cylindrical surface without in any way disfiguring the label, which method, while it has numerous advantages, is of particular importance in reinforcing paper packages and in securing in position by means of the labels, caps or covers having flanges overlapping the end portions of the cylindrical portions of the packages. Previously the labels could not be utilized to the best advantage in this way, as to avoid disfiguring, as described above, they were secured to the packages by paste spotting instead of coating.

Immediately beyond the paste coating roller the packages or cans are supported by their edges on the laterally inclined tracks 6 and are engaged as aforesaid, and held in position and fed forwardly as is the case during contact of the packages with the paste roller, by the can feed belts 5, deflected to angular position so that they engage the peripheral edges 35 only of the cans or packages. The tracks 6 also engage the peripheral edges only of the packages. Thus, any displacement or smearing of the adhesive by and on the belts and tracks is avoided. Immediately beyond the inclined track 6, I have shown the sides of the label box 74 and on the label table 75 the label pack 75', see Figures 7, 8, 9, 12, 15, 17 and 18, also the label pack and label feeding mechanism. The side 74 of the label box serves as tracks on which the packages roll at this point.

Referring particularly to Figure 18, the label table 75 is mounted to slide on a shaft 76 being arranged to travel in a slot 77 in the machine base best shown in Figure 7.

The table and labeling mechanism are controlled and fed forwardly as the labels are removed by means of a chain 78, Figure 18, to which the table carriage 79 is secured by means of a bolt 80, the chain also being straddled by lugs 81 on the carriage. This chain passes over the idler or guide sprockets 82 and 83 suitably supported on the machine base and is also passed around a drive sprocket 84, Figure 7, to which an intermittent motion is imparted, as hereinafter described to feed the label pack and particularly the top label to the proper position to be taken up by the corresponding package, each top label being taken up in turn by the packages rolling in succession over the packs. It may be noted at this time that the label pack and table may also be moved by a hand wheel 85 at the right in Figure 7, carrying a sprocket 86 which is connected by a chain 87 to a sprocket 88 secured to the shaft 89, which carries and drives sprocket 84 or is otherwise connected to the sprocket 84, which drives the carriage 79. The rotation of the sprocket 84 in response to the removal of the labels to feed the top label to the proper position as required, will be next considered. This is accomplished by means of a ratchet wheel 103 on shaft 84. However, this and all the details of the machine are subject to change.

Referring now to Figures 8 and 15, the label curler 91, which presses down on the top of the label pack 75' near the forward end, is mounted on levers 92 at its ends and at each side of pack 75'. These levers are keyed to a shaft 93 carried by a laterally extending lever 94 to the end of which a connecting rod 95 is pivotally connected. The holes in this lever are provided to reduce the weight of the lever 94 and not for purposes of adjustment. The rod 95 carries secured to its opposite end at the left in Figure 15 a plate 96, see also Figure 8 which as shown lies directly on the machine base 3, Figure 8. This plate 96, in turn, carries the depending rod 98, see Figure 8, which extends downwardly through a hole 95' in the base 3. This rod 98 carries at its lower end an arm 230, Figure 9, which engages a slot in an arm 231. The rod 98 is supported at its lower end in a bearing 232 on the end of bracket 233 so the arm 230 swings about said bearing as the rod 98 is oscillated about its axis by the action of the curler bar transmitted thereto through connecting rod 95. Pawl shield 100 is mounted on shaft 104 and secured thereto and thus operated from the curler bar.

The upper end of shield 100 cooperates with a flange 101 on the pawl 102, which is in cooperative relation with the ratchet 103 on the shaft 89. The pawl shield as shown is pivoted on shaft at 104 to which it is secured. The pawl carrier 116 on which pawl 102 is pivotally mounted at 115 oscillates about shaft 89. The carrier 116 is operated by an eccentric pin 105 carried by a shaft 106, driven by a belt 106' from a pulley on the main shaft 28. A tendency on the part of the pawl carrier to rock toward and past the roller 105 is imparted to the same by a spring 108, which spring is adjustable by means of a screw 109 and thumb nut 110 on a suitable bracket on the shield 100. The pawl 102 is mounted on a pivot pin 111 seated in carrier 116, and a spring 112 tends to hold the pawl in engagement with the ratchet.

The spring 108 being properly adjusted by means of the thumb nut 110 to bring the pawl carried in contact with the roller 105, the pawl in the position of the parts shown in which the shield 100 is out of contact with the flange 101 would be vibrated by the opposite tendencies of the roller 103 and spring 108. Loosening the spring frees the pawl carrier to such an extent that its momentum increases the throw and increases the motion which it imparts at each step to the ratchet. In the position shown the pawl serves to take up or rotate the ratchet with a step by step motion actuating the feed of the label table already described and feeding the label pack toward the belt 5 until the desired position of adjustment as to the position of the top label is reached, when the action of the curler bar 91 communicated through the members 96, 98, 99 brings the shield 100 into contact with the flange 101 holding the pawl out of the influence of the roller 105 so that there is no forward or actuating motion of the pawl, no rotation of the ratchet and no feeding of the label table pads.

Figure 8 shows a locking pawl 113 held in engagement with the ratchet by a spring 114 which in the absence of a manual release, as when it is desirable to move the table downwardly, prevents backward motion of the ratchet and downward motion of the label table.

It should be borne in mind in considering the action of both the coating roller 42 and the label feed that in the form of machine shown the cans or other cylindrical packages are in the position described with their axes inclined at any suitable angle which in the form of the machine shown is deflected thirty degrees from the vertical toward the horizontal, so that the top label, using the ordinary parlance which has been developed in connection with these machines, may be at any angle to the vertical from which point it is deflected to or toward the horizontal. As shown, it is in a plane deflected toward the horizontal 30° from the vertical, which is also true of the package contacting surface of the coating roller 42.

On account of the position of the label pack as described, slightly more than the ordinary degree of difficulty may be encountered in keeping the labels, particularly the top label, in position.

Referring to Figures 17 and 20, which show a view looking at the top of the label pack, i. e., at the top label which is inclined as aforesaid, I have shown means for holding the top label in position permitting it to be easily removed by the rolling package by which it is to be taken up. This holding means includes the usual label holding blades 129, the same being adjustable through a slide bearing 121 in the track or label box 74, in which the label blade shanks 122 are mounted being held in adjusted position by set screws 124.

In this view I have also shown the curler bar 91 which has the usual operation in the curling of the lap ends of the labels. In addition to these agencies, I have shown a label retainer or holder 126 which may be made of any suitable material, preferably of a yielding nature, different types of spring members as a metal spring, metal, also rubber or leather being available for this purpose. In the present instance this retainer is in the form of a flexible rubber rod or strip 126 which is passed through a bearing plug 127 through which it slides, being held in adjusted position by a set screw 128. These members 120, 126 are carried in the side walls or tracks 74 of the label support in which the bearing plugs 127 are seated, as best shown in Figure 16. This rubber holder member as shown is of round cross section with a V wedge shaped bottom indicated by reference character 129 shown in dotted lines in Figure 17.

Figure 17 also includes the tripping or actuating agencies of an electric stop motion whereby the passage of unlabeled cans or packages is detected and prevented. As the device of the invention contemplates the labeling of paper as well as metal and other receptacles, the conductivity of the container can not be utilized in all instances as a means for detecting unlabeled packages, wherefore it has been found advisable to provide an electric stop motion which is not dependent upon the conducting properties of the container. Also, in the passing of the packages over the label table, the contact of the container with the various electrical terminals of the stop motion device of the kind last suggested is more or less uncertain so that the present detector to be described possesses advantages in connection with the labeling of all types of containers.

Referring now to Figures 15, 17 and 20, Figure 17 shows a switch 130 which is normally in contact or closed, and which is referred to herein as the package switch. The switch elements 131 and 132, the latter being the moving element or arm, are mounted on a block of insulation 133 attached to the bottom guide rail 7. The moving arm 132 is shown in the form of a spring plate, the tension of which holds the contacts or terminals 134 normally closed. The plate or arm 132 extends beyond the cooperating stationary plate 131 and is engaged as to the projecting portion by a sliding pin or plunger pin 135 having an insulated end portion 136 contacting the switch arm. This actuating pin 135 is mounted to slide in a suitable bearing in the bottom guide rail 7, being normally withdrawn upwardly through the rail by a spring 137 bearing at one end against a flange or washer 138 on the pin and at the other end against the bottom of the hole 139 in the guide rail in which the pin is seated. The pin 135 carries at its upper end projecting into the path of the cans or packages a cam or dog 40 which has a reducing taper or incline in the direction from which the cans or packages are fed and the guide rail is recessed at 141 to permit the cam or dog 140 to be depressed into the rail out of the path of the can or package by said can or package as it passes.

In this way each can or package which is fed through the machine to this point, i. e., along the label pack as it approaches the curler bar, opens the circuit at the switch 130, it being understood that the machine is driven by an electric motor 4 and that the switch 130 is included in the circuit which actuates the motor.

The switch 130 is, however, located in a shunt so that the opening of a second switch while this switch remains open is necessary to stop the machine, otherwise the operation continues without regard to the opening of the switch 120, as just described.

In addition to the detector cam or dog 140,

Figures 17 and 20 show a second detector in the form of the label detector bar 143, this bar or rod extends across the top of the label pack just forward of curler bar 91, and it immediately overlies and rests on the top label. The switch to be discussed in this connection is best shown in Figure 15. The detector bar or rod 143 is carried by arm 144 pivoted at 145 and extending beyond the pivot at 144' substantially at right angles to the portions of the arm on the other side of the pivot into contact with the moving arm 146 of the label switch 147. The moving arm 146 has a shoulder 148 which in connection with the extension 144' of the arm 144 beyond the pocket 148, operates as a lock to hold the switch in the engaging position in which it is shown.

A spring 149 tends to hold the switch open and a spring 150 tends to return the detector to normal position by rotating the lever 144 and 144' in left handed rotation about the pivot 145.

Figure 15 shows still another member in the path of the packages to be contacted thereby as they pass. This is a projecting pin which will be referred to as a trigger 151. This projects upwardly through the pad 152 with which the packages come in contact as they leave the label table. This pin 151 is advanced into the path of the packages by a spring 153 which engages a collar 154 thereon and at its opposite end a stationary abutment 155. The pin 151 projects through this abutment 155 and carries at its end beyond said abutment a collar 156 which may be provided with insulation 157 which engages the switch arm 146.

When the packages engage the pin 151, it forces the switch arm 146 downwardly causing the contacting points 158 to pass releasing the arm 144' from the shoulder 148 so that it is returned by the spring 150 to normal position in which the detector rod 143 is in contact with the top label.

The operation of the detector mechanism is as follows: Referring to Figure 20, a package 159 is shown at the left where it has picked up the top label 160 which is being rolled about the package. As the top label is raised in this way, it tends to raise the detector bar 143 and closes the switch 147 to the position in which it is shown in Figure 15, and in which it is locked. Immediately thereafter the package comes in contact with the cam or dog detector 140 opening the switch 130 in the shunt which switch is automatically closed as soon as the package has passed. As the package passes off of the label pack, it contacts the trigger 151 releasing the switch 147 and permitting it to be automatically opened as already described.

If by any chance, however, the top label of the pack has failed to adhere so that the package tends to go through unlabeled, the detector rod 143 which is dependent for its operation in closing the switch 147, on being raised by the label which is being picked up from the pack by the package as it passes, is not operated, the switch 147 is not closed but remains in normal open position and the shunt circuit being opened by contact of the can or package with the detector dog or cam 140 which opens the switch 130 in Figure 17, the machine is stopped and attention is thus called to the unlabeled can or package which is thus held to be removed and the top label if it is in any way defective, is also removed and the detector switch being closed, the machine is again started. It is of interest that the machine may be stopped and started by button switch 213, Figure 5.

In Figure 14, I have shown the details of an adjustment of the curler bar to determine the position of the outer and in the ordinary parlance, the top label of the pack, i. e., the position to which the feed of the top label is adjusted.

The lever arm 94, see Figures 14 and 15, is rotatively mounted on the label curler shaft 93 and the label curler 91 is carried on a bracket arm 92, keyed to the label curler shaft 93. The label curler shaft 93 is also provided with a projecting dog or finger 166 keyed thereto, see Figure 14, and apertured to pass an adjusting screw 167 mounted in a bracket 170 on the end of the arm 94.

The screw 167 has a cross bar 168 at the top which is seated in a notch 169 in a projecting head 174 of the bracket 170 on the end of the arm 94. The screw 167 is engaged at its end opposite to the cross bar 168 by a nut 171 which is held in adjusted position by a tooth 172 on the finger 166. The dog 166 is held in contact with the nut 171 by a helical spring 173, which encircles the screw shank bearing on said finger at one end and at the other end against the notched head 174 of the bracket 170, determining the angle of arm 92 to and with arm 94 and hence the position of curler bar 91 relative to arm 94. By taking up on the nut 171, the curler bar shaft 165 may be adjusted as to its angular position relatively to the arm 94 whereby the angular position of the curler bar arm or bracket 92 is adjusted and hence the position of the curler bar 91 is adjusted relatively to the label table, determining the thickness of the label packs and the position of the top label, and the height of the label pack.

This provides for adjustment to get proper contact of the packages with the top label and for different sized packages. Incidentally, various elements of the machine are adjustable to engage and operate on packages of different sizes and diameters. See adjustable stops 35 for rollers 32, 38. Also the feed belt pulleys 12 and 22 are adjusted as to their position by sliding brackets 207 carried on shanks 208 held in adjusted position by set screws 209.

As the cans or packages are about to leave the label pack, they engage the lap ends of the labels which are pulled from under the curler bar and thus curled so that they lie in close contact with the outside of the adjacent portion of the label which they overlap. When the label has been picked up by the adhesive on the cylindrical surface of the can or package, in order that the lap end of the label may adhere to the portion of the label which it overlaps, it is necessary that this lap end be coated with adhesive. For this purpose the machine is provided with a lap end pasting or coating belt 40, see Figure 1. This portion of the mechanism is best shown in Figure 12. The lap end pasting belt or coating belt 40 runs through a lap end pasting pot 176. This belt passes over a drive pulley 165 at the bottom which is mounted on a shaft 211 which carries a toothed gear 212 meshing with a pinion 214 carried by a sprocket 215 driven by a chain 216 which is in turn driven by a sprocket 217 on the main shaft 28. The belt 40 passes at the upper end over an idler pulley 177 mounted on a shaft 178 mounted on bracket 180, see Figure 1. The belt 40 runs in the direction indicated by the arrow in Figure 12, i. e., downwardly to the left into the paste pot and upwardly at the right, and the downward traverse of the belt passes directly in contact with the top or outer label of the pack 75' immediately adjacent the curler bar 91. In order to prevent the application of an excess of adhesive to the lap ends of the labels with the consequent smearing of the adjacent parts of the machine and the outer surfaces of the labels, the lap end pasting belt 40 is scraped as it passes upwardly out of the paste pot, the quantity carried thereby being thus limited to the exact predetermined amount and arrangement thereof on the belt so that a definite predetermined quantity of paste is transferred to the lap ends of the labels.

The scraping mechanism disclosed herein while it is shown in connection with a particular type of labeling machine, is like several novel features of this machine adapted for general application. The machine base 3, where it overlies the paste pot, is slotted at 180 to admit the belt 40 and the pulley 175, and the base 3 is provided immediately adjacent this slot on the upgoing side of the pulley with a slotted scraper 181 which removes the excess paste from the pulley and belt to prevent the carrying up out of the pot and spilling of an excess of paste which might adhere to the wheel and belts.

Carried on a bracket 181 immediately above the slot 180 in the belt is a scraping mechanism 220 which limits the paste carried forward by the belt to the label pack to the exact predetermined quantity. The thickness of the paste on the belt is determined by a thickness or surface scraper 182 which is pivotally mounted on one side scraper 184 at 183 and is adjusted toward and from the belt by means of a screw 185 which engages a fixed arm 186 secured by set screw 186' to stationary shaft 191 on the bracket 181, the tail 188' of the scraper operating against a spring takeup 187 whereby the scraper arm 188 is held in contact with the head 189 of said screw. The side scrapers 184 and 190 are slidably and rotatively mounted on the shaft 191 so that they can be adjusted laterally by the collar 192 secured in adjusted position by means of the screw 193. The side scrapers 184 and 190 are provided with scraper blades 194 projecting from each side scraper lever 184 and 190 toward the center of the belt 40 and they are held in contact with the belt by means of a spring 195 which is wound around the shaft 191 and held by means of collar 196, said spring having a projecting arm 195', which hooks over the scraper 194, pressing it toward the belt and this scraper 184 is provided with a finger 197 which overlaps the scraper 190 so that equalized tension of the spring 195 is applied to both side scrapers holding these blades 194 in contact with the belt 40 from which they scrape the entire remaining layer of adhesive except as to the single line or strip 198 at the center of the belt 40 between the scraper blades 194 which remains on the belt. I thus provide a predetermined quantity of adhesive to be applied to the lap end of the label from the center of the lap end pasting belt so that it can be thinly distributed on the lap end of the label without any tendency to accumulation of paste at the edges of the belt and consequent smearing and deposit of lumps of paste on the lap end of the label.

As the package leaves the label pack, it passes on to the pad 152 in contact with which it is rolled by the action of the feed belts 5 which are held close against the edges.

Beyond the pad 152 which is of felt or similar material is the finishing roller 200 which completes the rolling and smoothing of each label into close contact with the cylindrical surface of the corresponding package. This roller is driven directly from the main drive shaft 28 by means of the worm gearing 201, which causes the upper surface of the roller 200 to move oppositely to the belts 5, 5. In this way the surface of the roller 200 is caused to move with the contacting surfaces of the packages whereby it serves to roll the labels into close contact with the packages without rubbing them. This action of the roller 200 and coating roller 42, which is similar in its operation, is of great importance.

As the cans or packages pass the roller 200, they are deposited on the delivery pad 201 from which they are delivered to a suitable runway to be assembled for packaging in cartons or otherwise in accordance with the regular practice.

The operation of the machine and the passage of the cans or packages therethrough has been so fully described in connection with the description of the mechanism that further description of the operation is believed to be superfluous.

While the various features of the machine have been described in connection with a mechanism by which the cans are fed to the machine at an angle diverging from the vertical to permit the cylindrical packages to be rolled on their sides, the coating roller, the label table, the lap end pasting belt, the curler bar, the pad and the finishing roll being correspondingly inclined to cooperate with the cylindrical surfaces of the package, these various elements and the features and details thereof are introduced as well to be used in machines in which the packages are fed by rolling with their axes horizontal.

I have thus described specifically and in detail a machine and method embodying the features of my invention in the preferred form in order that the manner of constructing, applying, operating and using the same may be fully understood, however, the specific terms herein are used descriptively rather than in a limiting sense, the scope of the invention being defined in the claims.

What I claim as new and desire to secure by Letters Patent is:

1. In a machine for labeling cylindrical packages, guiding and supporting means for holding the packages in a position in which they are inclined at an angle to the vertical, and feeding means comprising a feed belt engaging the packages on the side opposite the supporting means and means for moving the portion of the belt in contact with the packages in the direction of the feed for feeding the packages through the machine by rolling and label presenting means and coating means for adhesive similarly inclined whereby the labels are applied and affixed to the packages as they pass through the machine.

2. In a machine for labeling cylindrical packages, means for feeding the packages by rolling and means for oppositely supporting the packages, said means contacting the peripheral end edges only, means for coating substantially the entire cylindrical surface of each package with adhesive as it is fed, and means for applying a label thereto whereby it is secured by said adhesive to substantially the entire cylindrical surface of the package, the coating being limited to an area slightly less than the width of the label.

3. In a machine for labeling cylindrical packages, means for feeding the packages by rolling and means for oppositely supporting the packages, both said feeding and supporting means having exceedingly narrow lines of contact with the circular end edge portions only of said packages, means for coating substantially the entire cylindrical surface of each package with adhesive as it is fed, and means for applying a label thereto whereby it is secured by said adhesive to substantially the entire cylindrical surface of the package.

4. In a machine for labeling cylindrical packages, means for feeding the packages by rolling and means for oppositely supporting the packages, said means contacting the peripheral end edges only, means for coating the cylindrical surface of the package with adhesive as it is fed, means for applying a label thereto whereby it is secured by said adhesive to substantially the entire cylindrical surface of the package, said feeding and supporting means serving to hold the packages as they are fed in a position with the axis inclined at an angle to the upright, the coated area being limited to a width slightly less than the width of the labels.

5. In a machine for labeling cylindrical packages, means for feeding the packages by rolling and means for oppositely supporting the packages, both said means contacting the peripheral end edges only, means for coating the edge portion of the cylindrical surface of the package with adhesive as it is fed, means for applying a label thereto whereby it is secured by said adhesive to said edge portion of the cylindrical surface of the package, said feeding and supporting means serving to hold the packages as they are fed in a position with the axis inclined at an angle to the upright.

6. In a machine for labeling cylindrical packages, means for feeding the packages, means for oppositely supporting the packages, said means inclined to the axes of the packages to contact the peripheral end edges only of the packages, means for coating substantially the entire cylindrical surface of each package with adhesive as it is fed, means for applying a label thereto whereby it is secured by said adhesive to substantially the entire cylindrical surface of the package, said feeding means and supporting means serving to feed the packages by rolling and to hold and support the packages as they are fed in a position in which they are inclined upwardly from the horizontal, said machine also being provided with a guide engaging the end surface of each package.

7. In a machine for labeling cylindrical packages, means for feeding the packages, means for oppositely supporting the packages, both said means being inclined to the axes of the packages to contact the peripheral end edges only of the packages, means for coating an end portion and other portions of the cylindrical surface of each package with adhesive as it is fed, means for applying a label thereto whereby it is secured by said adhesive to an end portion and other portions of the cylindrical surface of the package, said feeding means and supporting means serving to feed the packages by rolling, the application of the coating being limited to an area spaced slightly inward from the edges of the labels.

8. In a machine for labeling packages, means for supporting the packages and feeding them along the supports, the feeding means and the supporting means engaging the peripheral edges only, a coating roller engaging the cylindrical surface of each package as it passes, and means for feeding and applying labels to the packages to be picked up by the packages as they pass.

9. In a machine for labeling packages in which the packages are rolled through the machine, feeding means and supporting means engaging the edges only of the packages, a coating roller in the path of the packages, said roller being adapted to contact the cylindrical surfaces of the packages, means for rotating the roller so the contacting portion moves oppositely to the feed whereby it has a rubbing action on the packages, means for applying adhesive to the roller and label feeding and applying means adjacent the path of the cans whereby the labels are presented to the packages to be picked up thereby as they pass.

10. A machine for labeling packages in which the packages are rolled through the machine, said machine comprising feeding means and supporting means for the packages laterally inclined to engage the unlabeled end edge portions only of the packages, coating means for the packages, said coating means comprising a roller contacting cylindrical surfaces of the packages, means for coating the roller with adhesive, label feeding and applying means adjacent the path of the packages, and means for rotating the roller to cause the contacting surface to move oppositely to the feeding motion of the packages.

11. A machine for labeling packages in which the packages are rolled through the machine, said machine comprising feeding means and supporting means for the packages laterally inclined to engage the unlabeled end edge portions only of the packages, coating means for the packages, said coating means comprising a roller contacting the cylindrical surface of the packages, means for coating the roller with adhesive, label feeding and applying means adjacent the path of the packages, and means for rotating the roller to cause the contacting surface to move oppositely to the feeding motion of the packages, the surface speed of the roller being less than the surface speed of the package in rolling.

12. In a machine for labeling cylindrical packages, means for feeding the packages through the machine by rolling, paste applying means, a label table adjacent the path of the packages for presenting the labels to the cylindrical surfaces of the packages as the packages roll over the top label which is picked up by each package as it passes, means for holding the top label in position on the top of the label pack comprising a finger of flexible material projecting transversely of the feed over the top label and in contact therewith inwardly from the lateral side of the table and means for supporting said finger.

13. In a machine for labeling cylindrical packages, means for feeding the packages through the machine by rolling, paste applying means, a label table adjacent the path of the packages for presenting the labels to the cylindrical surfaces of the packages as the packages roll over the top label which is picked up by each package as it passes, means for holding the top label in position on the top of the label pack comprising a finger of flexible material projecting transversely of the feed over the top label and in contact therewith inwardly from the lateral side of the table and means for supporting said finger, the label table being inclined so that the top label is in a plane at an angle to the horizontal and the feeding means being similarly disposed.

14. In a machine for labeling cylindrical packages, means for feeding the packages through the machine by rolling, and paste applying means, a label table adjacent the path of the packages for presenting the labels to the cylindrical surfaces of the packages so that the packages roll over the top label, which is picked up by each package as it passes, means for holding the top label in position on the top of the label pack comprising a finger of rubberlike composition projecting transversely of the feed over the top label and in contact therewith for a short distance inwardly from the edge of the label, and supporting means for said finger.

15. In a machine for labeling cylindrical packages, means for feeding the packages through the machine by rolling, paste applying means, a label table adjacent the path of the packages supporting a label pack to present the labels to the cylindrical surfaces of the packages so that the packages roll over the top label which is picked up by each package as it passes, said machine having an electrical drive and means for stopping the machine to prevent the passage of unlabeled packages, notifying the operator of the failure of a package to pick up the corresponding label comprising a shunt parallel to the main circuit, a switch therein normally closed, a package detector in the path of the packages passing over the label pack, means connecting said detector to said switch to open the circuit through the shunt as each package passes over the table and engages said detector, a detector overlying the top label adjacent said first mentioned detector, the circuit having a label detector switch and means connecting the same to said detector to be closed thereby as each label is withdrawn, moving said label detector, the label detector being located to operate prior to the contact of the package with the package detector to close the label detector switch prior to the opening of the package detector switch, means tending to hold the label detector switch normally open and means for locking the same when closed by the label detector and a trigger in the path of the packages beyond the label detector in the direction of feed and beyond the package detector for unlocking the label detector switch causing it to open before the next package comes in contact with the package detector.

16. In a machine for labeling cylindrical packages, means for feeding the packages through the machine by rolling, paste applying means, a label table adjacent the path of the packages supporting a label pack to present the labels to the cylindrical surfaces of the packages so that the packages roll over the top label which is picked up by each package as it passes, said machine having an electrical drive and means for stopping the machine to prevent the passage of unlabeled packages notifying the operator of the failure of a package to pick up the corresponding label comprising a shunt parallel to the main circuit, a switch therein normally closed, a package detector in the path of the packages passing over the label pack, means connecting said detector to said switch to open the circuit through the shunt as each package passes over the table and engages said detector, a detector overlying the top label adjacent said first mentioned detector, the circuit parallel to said shunt having a label detector switch therein, means connecting the same to said detector to be closed thereby as each label is withdrawn moving said label detector, the label detector being located to operate prior to the contact of the package with the package detector to close the label detector switch prior to the opening of the package detector switch.

17. In a machine for applying labels to cylindrical packages having feeding means for passing the packages through the machine by rolling, means for applying adhesive and means for supporting a label pack in the path of the packages so that the packages roll over the top label as they are fed through the machine and electrical driving means for the machine, of a stop motion consisting of a switch and means actuating the same in time with each package as it passes over the label table to open the circuit and a label detector to be actuated by each label as it is picked up and means in combination therewith and actuated thereby to close the circuit to prevent stoppage of the machine due to the operation of the said actuating means, the failure of a package to pick up a label resulting in stoppage of the machine.

18. In a machine for labeling cylindrical packages, means for feeding the packages through the machine by rolling, adhesive applying means and label applying means, the feeding means comprising a feed belt and a spacer belt for presenting the packages to the feed belt and means for driving said spacer belt at a speed which is relatively slow as compared to the motion of the feed belt and bearing a predetermined ratio thereto to space the packages apart by a predetermined distance as they are passed through the machine and a spring supporting plate in opposition to the spacer belt, the spring plate extending well forwardly of the spacer belt in opposition to the feed belt to hold the packages in contact with the latter during the initial portion of its feed.

19. In a machine for labeling cylindrical packages, feed belts for feeding the packages through the machine, tracks opposite to the feed belts for supporting the packages in opposition to the feed belts, means for applying adhesive to the cylindrical surfaces of the packages, said tracks being inclined laterally to the axes of the packages so that they engage the peripheral end edges only of the packages, and feed belts supporting and guiding rollers having surfaces similarly inclined to the axes of the packages, the packages as they pass serving to press the belts against the rollers and deflect them to a corresponding angular position relatively to the packages so that the belts engage the peripheral end edges only of the packages.

20. In a machine for labeling cylindrical packages, feed belts for feeding the packages through the machine, tracks opposite to the feed belts for supporting the packages in opposition to the feed belts, means for applying adhesive to the cylindrical surfaces of the packages, said tracks being inclined laterally to the axes of the packages so that they engage the peripheral edges only of the packages and means presenting the belts in a correspondingly inclined position so that they engage the peripheral end edges only of the packages.

21. In a machine for labeling cylindrical packages, means for feeding the packages through the machine in a position inclined from the horizontal toward the vertical of adhesive applying means similarly inclined and a label holder adapted to hold a label pack with the top label adjacent the path of the packages and similarly inclined, and means for holding the top label in position comprising a finger of flexible material extending over the top label in a lateral direction adjacent the edge and adapted to yield as the label is picked up by the package to facilitate its withdrawal.

22. In a machine for labeling cylindrical packages having pasting means and means for supporting a label pack, means for feeding the packages by rolling over the pack, a label curler bar overlying the top label, a label feed comprising a ratchet and pawl and a pawl shield controlling said pawl and connections from the shield to the label curler bar so that the labels are fed in accordance with the position of the bar and the height of the label pack, said connections including a swinging arm operated by the curler bar, a connecting rod and a shaft oscillated about its axis by said connecting rod, and means connecting said shaft to said shield to operate the shield.

23. In a machine for labeling cylindrical packages having pasting means and means for supporting a label pack, means for feeding the packages by rolling over the pack, a label curler bar overlying the top label, a label feed, means controlling said feed and connections from said means to the label curler bar so that the labels are fed in accordance with the position of the bar and the thickness of the label pack, swinging arms pivotally mounted supporting the label curler at their swinging ends and means for adjusting said arms and said label curler relatively to said connecting means whereby the label curler is connected to the feed control by swinging them about their pivots to determine the position of the label curler and of the top label.

24. In a machine for labeling cylindrical packages, means for feeding the packages through the machine by rolling, comprising a feed belt, means for coating substantially the entire cylindrical surfaces of the packages with adhesive and applying labels thereto, means for guiding the feed belt causing it to be presented at a laterally inclined angle so as to engage the peripheral end edges only of the packages, and tracks cooperating with said feed belt and opposite thereto, said tracks being inclined oppositely to the belts and adapted to engage the end edges only of the packages.

25. In a machine for labeling cylindrical packages, means for feeding the packages through the machine by rolling means and supporting them as fed with the axes inclined to the horizontal, means for applying adhesive, a label table supported at an angle corresponding to the angle of the packages, and means for feeding the labels toward the path of the packages in a direction transverse to the table and inclined at an angle complementary to the angle of incline of the said axes to the vertical.

26. In a machine for labeling cylindrical packages, means for feeding the packages through the machine by rolling, means for applying adhesive to the packages as they pass and means for presenting labels to the packages comprising a label table for supporting a pack of labels over which the packages are rolled so that each in turn takes up a label in passing, means for feeding the labels and an electric stop motion for stopping the machine on the passage through the machine of a package which fails to pick up a label.

27. In a machine for labeling cylindrical packages, a feed belt for feeding the packages through the machine by rolling, adhesive coating and label presenting means near the path of the packages, spacing means for presenting the packages to the feed belt comprising a belt moving at a slower speed than the feed belt, and resilient means for supporting the packages beneath the spacer belt said means extending forwardly in opposition to the feed belt, a coating roller projecting into the path of the packages beyond said means in the direction of feed and a relatively rigid support beneath said resilient means and immediately adjacent the said roller, supporting the packages in opposition to said belt until they are engaged by said roller.

28. In a machine for labeling cylindrical packages, a feed belt for feeding the packages through the machine by rolling, adhesive coating and label presenting means near the path of the packages, spacing means comprising means for presenting the packages to the feed belt in the form of a belt moving at a slower speed than the feed belt and resilient means for supporting the packages beneath the spacer belt said resilient means serving to hold the packages in contact with the space belt.

29. In a machine for labeling cylindrical packages, a feed belt for feeding the packages through the machine by rolling, adhesive coating and label presenting means near the the path of the packages, spacing means for presenting the packages to the feed belt comprising a belt moving at a slower speed than the feed belt, a frame pivotally mounted and supporting the spacer belt, means for supporting the packages beneath the spacer belt and means for adjusting the spacer belt toward said package supporting means.

30. In a machine for labeling cylindrical packages, a feed belt for feeding the packages through the machine by rolling, adhesive coating and label presenting means in the path of the packages, spacing means or presenting the packages of the feed belt comprising a belt moving at a lower speed than the feed belt, means for supporting the packages and means for adjusting the spacer belt toward said support, said spacer belt being yieldingly mounted so that it may yield away from the support, a feed belt pulley at the feeding end near the spacer, and resilient means beneath said pulley for supporting the packages.

31. In a machine for labeling cylindrical packages, feed belts for feeding the packages through the machine, tracks opposite to the feed belts for supporting the packages in opposition to the feed belts, means for applying adhesive to the cylindrical surfaces of the packages, said tracks being inclined laterally to the axes of the packages so that they engage the peripheral edges only of the packages and spring rollers having surfaces similarly inclined to the axes of the packages, the packages serving to press the belts against the rollers and deflect them to a corresponding angular position relatively to the packages so that they engage the peripheral end edges only of the packages.

32. In a machine for labeling cylindrical packages, means for feeding the packages through the machine by rolling, adhesive applying means and means for presenting labels to the packages and rolling them about the packages to be affixed thereto by the adhesive and a finishing and smoothing roller in the path of the packages beyond the label presenting means, said roller having a cylindrical surface projecting into the path of the packages, the roller being adapted to rotate, moving the projecting portion oppositely to the direction of feed of the packages and similarly to the direction of motion of the surfaces of the packages engaged.

33. In a machine for labeling cylindrical packages, means for feeding the packages through the machines by rolling, adhesive applying means and means for presenting labels to the packages and rolling them about the packages to be affixed thereto by the adhesive and a finishing and smoothing roller in the path of the packages beyond the label presenting means, said roller having a cylindrical surface projecting into the path of the packages and means for rotating the roller whereby said projecting portion of the surface moves oppositely to the direction of feed of the packages and at a speed less than the surface speed of the packages as they are rolled through the machine.

34. In a machine for labeling cylindrical packages, means for feeding the packages through the machine by rolling, a roller having a contacting surface projecting into the path of the packages, means for applying adhesive to the roller whereby the cylindrical surface of each package is coated with adhesive as it passes, means for rotating the roller so that the contacting portion moves oppositely to the direction of feed of the packages, means for presenting labels to the packages whereby they are rolled about the packages and affixed thereto by the adhesive and a finishing and smoothing roller in the path of the packages having a portion contacting the packages and means for rotating the finishing roller oppositely to the direction of feed of the packages, said rollers being driven at a surface speed less than the surface speed of the packages as they are fed through the machine by rolling so that they have a rolling action in contact with the packages.

35. In a machine for labeling cylindrical packages, means for feeding the packages through the machine by rolling and supports for the packages opposed to the feeding means providing a predetermined path along which the packages are fed, the feeding means and the supports having inclined surfaces converging respectively at the opposite sides of said path and therefore engaging the peripheral end edges only of the packages, the feeding means and the supports at each end of the packages being oppositely inclined.

36. In a machine for labeling cylindrical packages, means for feeding the packages through the machine by rolling and supports for the packages opposed to the feeding means whereby the packages are moved along a predetermined path, the feeding means and the supports having surfaces engaging the peripheral end edges of the packages and being inclined so that said surfaces converge outwardly and tend to meet at each side of said path, the feeding means and the supports at each axial end of the packages being oppositely inclined, means for applying adhesive to the surfaces of the packages and means for presenting labels to the packages whereby they are rolled about the packages and secured by the adhesive.

37. In a machine for labeling cylindrical packages, means for feeding the packages through the machine by rolling and supports for the packages opposed to the feeding means whereby the packages are moved through the machine on a predetermined path, the feeding means and the supports being spaced apart and engaging the opposite peripheral end edges only of the packages, the feeding means and the supports having the surfaces which engage the packages at each end of the packages oppositely inclined and converging outwardly at each side of said path, means for applying adhesive to the cylindrical surfaces of the packages and means for presenting labels to the packages whereby they are rolled about the packages and secured by the adhesive, said means for applying adhesive being in the form of a roller contacting the cylindrical surfaces of the packages as they pass, and means for rotating the roller.

38. In a machine for labeling cylindrical packages, means for feeding the packages through the machine by rolling and supports for the packages opposed to the feeding means, the feeding means and the supports engaging the peripheral end edges only of the packages and being inclined to the axes of the packages as fed, the feeding means and the supports at each end of the packages being oppositely inclined, means for applying adhesive to the surfaces of the packages and means for presenting labels to the packages whereby they are rolled about the packages covering substantially the entire cylindrical surfaces of the packages and secured by the adhesive, said means for applying adhesive being in the form of a roller contacting substantially the entire cylindrical surfaces of the packages as they pass, and means for rotating the roller so that the contacting surface moves oppositely to the direction of feed of the packages and in correspondence with the motion of the surfaces of the packages which are contacted by the roller.

39. In a machine for labeling cylindrical packages applying the labels to substantially the entire cylindrical surface of the packages, ways along which the packages are rolled in feeding, said ways having supporting surfaces for the packages adapted to engage the packages at their circular end edges only, said surfaces being inclined transversely of the ways and converging outwardly from the ways, side guides engaging the ends of the packages for determining the path of the packages on the ways, and means for feeding the packages along the ways.

40. In a machine for labeling cylindrical packages, applying the labels to substantially the entire cylindrical surfaces of the packages, ways along which the packages are rolled in feeding, said ways having supporting surfaces for the packages adapted to engage the packages at their circular end edges only, said surfaces being inclined transversely of the ways and converging outwardly from the ways, side guides engaging the ends of the packages for determining the path of the packages on the ways, means for feeding the packages along the ways, the feeding means having narrow lines of contact with the packages.

41. In a machine for labeling cylindrical packages, applying labels to substantially the entire cylindrical surfaces of the packages, ways along which the packages are rolled in feeding, said ways having supporting surfaces for the packages adapted to engage the packages at their circular end edges only and said surfaces being inclined transversely of the ways and converging outwardly from the ways, side guides engaging the ends of the packages for determining the path of the packages on the ways, means for feeding the packages along the ways, the feeding means having a narrow line of contact with the packages to avoid injury to the label, the machine including coating means for applying adhesive to substantially the entire cylindrical surface of the package prior to the application of the label.

CHARLES HENRY WILD.